United States Patent [19]
Reinbold et al.

[11] Patent Number: 6,007,852
[45] Date of Patent: Dec. 28, 1999

[54] CALCIUM ENRICHED NATURAL CHEESE

[75] Inventors: Robert S. Reinbold, Fond du Lac; Richard E. Willits, Elkhart Lake; Kim M. DeSmidt, Plymouth, all of Wis.

[73] Assignee: Sargento Foods Inc., Plymouth, Wis.

[21] Appl. No.: 09/058,576

[22] Filed: Apr. 10, 1998

[51] Int. Cl.$^6$ .................................................. A23C 19/082
[52] U.S. Cl. ............................................. 426/74; 426/582
[58] Field of Search ................................. 426/74, 582, 36

[56] References Cited

U.S. PATENT DOCUMENTS

| | | | |
|---|---|---|---|
| 4,784,871 | 11/1988 | Park | 426/583 |
| 5,573,806 | 11/1996 | Farkye et al. | 426/582 |
| 5,766,330 | 6/1998 | Knights et al. | 106/124.2 |

OTHER PUBLICATIONS

Gestaldi et al., "Functions of Added Calcium . . . ", *J. Food Sci.*, 59(2):310–312, 1994.
Food Product Design, vol. 7, No. 3, p. 129, Jun. 1997.

*Primary Examiner*—Keith Hendricks
*Attorney, Agent, or Firm*—Ryan Kromholz & Manion, SC

[57] ABSTRACT

A natural cheese having at least 210 milligrams of calcium per 28 grams of said natural cheese. The calcium enriched natural cheese comprising: a calcium material suspended in a natural cheese by dispersing the calcium material generally throughout a cheese milk and processing the cheese milk into a natural cheese. The natural cheese has at least 0.0075 grams of calcium material per each gram of natural cheese. The method of producing a predetermined natural cheese enriched with a dispersible calcium material includes the steps of adding the calcium material to a predetermined processing liquid to form a slurry, agitating the slurry for a predetermined period of time, dispersing the slurry in a cheese milk prior to setting the cheese milk, and completing a cheese manufacturing process.

11 Claims, No Drawings

6,007,852

CALCIUM ENRICHED NATURAL CHEESE

BACKGROUND OF THE INVENTION

The present invention relates generally to cheese and specifically to the calcium enrichment of natural cheese product. Natural cheeses are cheeses that are produced by combining various ingredients to produce a resultant cheese. Natural cheeses are distinct from processed cheeses, which are a cheese product manufactured by combining a natural cheese with other ingredients. Processed cheeses are produced by processing, e.g., grinding up, or preparing in some manner, natural cheese and then mixing the prepared natural cheese with emulsifying agents, e.g., emulsifying salts, and other materials. Usually, other work, such as heating the resulting mixture to produce a homogenous mass of processed cheese, is also subsequently performed. Accordingly, a processed cheese is literally a natural cheese which has subsequently been processed.

The present invention relates to a method of manufacturing a natural cheese, as opposed to a processed cheese, with enhanced calcium levels. The present invention is a novel and unique process and the resulting product addresses the production of cheese having the desirable qualities of natural cheese plus an enhanced calcium level.

Because calcium is already present in dairy products such as natural cheese it is not, upon initial consideration, apparent why it would be desirous to increase the level of calcium. Cheese is a natural source of calcium and people eat cheese, among other reasons, to get calcium. However, even people who eat cheese do not necessarily eat sufficient quantities to obtain some or all of the calcium they may require. The present invention makes it easier for a person to eat a sufficient quantity of cheese to obtain some or all of the calcium they may require.

Some people may have a special need for additional calcium in their diet. For example, it is well established that many women in our society do not get sufficient levels of calcium from their normal diet. This may lead to debilitating conditions such as osteoporosis. Enhancement of the calcium level of natural cheese allows consumers to eat a good natural cheese product, which provides them with a substantially higher level of calcium than natural cheeses which have been heretofore produced. Consumers are thereby provided with a product which has more of the mineral that they desire from natural cheese than they previously could receive.

The inventors know of no prior art that teaches the present invention. For example, U.S. Pat. No. 4,784,871 (Park), U.S. Pat. No. 4,609,553 (Zboralski), and U.S. Pat. No. 5,573,806 (Farkye) are all related to the addition of calcium to cheese.

Park discloses a method for producing a calcium fortified yogurt wherein an acid-soluble calcium salt is added to fruit flavoring which is then subsequently combined with the yogurt base. It is questionable whether Park may be applied to cheese making; however, even if Park were considered analogous, the process disclosed in Park is clearly related to the manufacture of a processed material. In other words, the calcium is added to a yogurt base, which has already been produced and then undergone further processing.

Farkye discloses a method wherein anhydrous calcium chloride is dissolved in a small volume of water to form slurry. This slurry is added to milk containing approximately 3% fat ( pH 7.5) at a rate of approximately 0.02% (wt./wt.). The milk is then heated at the rate of 1.3° C. (2.3° F.) per minute to a temperature of 80°–90° C. and is held here for 10–60 minutes (30 minutes is indicated or preferred). A 2% solution of food-grade organic acid at a temperature of 55° C.–80° C. (79° C./175° F.) is added to the milk to reduce the pH to 4.2 to 5.0 (pH 4.4 is preferred) and to form the curd. The curd-whey mixture is held at a temperature of 73° C.–75° C. for about 10 minutes under quiescent conditions whereupon the whey is drained. The curd is trenched to facilitate complete whey removal. Salt (NaCl) is added to the curd at 50°–70° C. at a rate of 2%(wt./wt.) of curd in three approximately equal applications. The salted curd is hooped into stainless steel hoops and pressed for about 30–40 minutes at about 40 psi. The hoops are cooled for 30 minutes–2 hours to about 26° C. (80° F.). The hoops are then transferred to a cold room at 7°–10° C. (45°–50° F.) where they are held overnight. The cheese is then vacuum-packaged. The cheese formed has the following characteristics: moisture 48–55%; protein 20–22%; fat 18–21%; pH 5.1–5.5; and calcium 348–587 mg/100 g cheese. Farkye cheese has a mild flavor, excellent sliceability, is melt resistant and remains fresh for at least 9 weeks of refrigerated storage. A calcium level of about 300–600 mg/100 g of cheese is taught. However, the natural cheese product of the present invention is not melt resistant and has the good melting characteristics of natural cheese and approximately 72.4% more calcium content than the maximum level of calcium content taught by Farkye.

Also, the cheese product produced by Farkye is essentially heat stable and, unlike the present invention, will not melt at temperatures below about 400° F. Additionally, the cheese produced by Farkye is always a soft or semi-soft white cheese.

Zboralski discloses the use of tricalcium phosphate to raise the levels of calcium in process cheeses. However, Zboralski indicates, in the context of soft cheeses, that very precise levels of calcium and only specific types of calcium may be used. Zboralski indicates that straying from the calcium levels specified in his patent caused the resultant cheeses to be unpalatable. Further, it is apparent that Zboralski teaches application of its process to the creation of process cheeses; see Examples 1–6 of Zboralski. Zboralski also teaches application to a spreadable soft processed cheese and requires a $CaO/P_2O_5$ ratio of 2.5:1 to 3.1:1, and a beta-tricalcium phosphate content from 50 to 100 percent. The present invention does not fall within these parameters.

Also, the present invention is a unique and simple process and does not require the use of special or additional structures to microencapsulate the calcium material used. The present process produces a cheese having enhanced levels of calcium and a good flavor without having to provide special steps for coating or encapsulating the enriching mineral used.

SUMMARY OF THE INVENTION

This invention relates to the fortification of natural cheese with calcium. More specifically, this invention relates to the addition of calcium, preferably a tricalcium phosphate, preferably in a predetermined processing liquid such as water or skim milk, to cheese milk used to manufacture cheeses. The process of the present invention may be used in conjunction with any known process for the manufacture of a natural cheese.

The present invention may be generally described as preferably being a natural cheese having at least, approximately, 210 milligrams–300 milligrams of calcium per 28 grams of said natural cheese, depending upon the natural cheese being produced; 28 grams being approximately equal to one (1) ounce. Alternatively, the product is calcium enriched natural cheese comprising at least 0.0075 grams–0.0107 grams of calcium material per gram of natural cheese.

The present invention may also be described in terms of a method for enriching cheeses with calcium by dispersing a calcium material into a predetermined processing liquid, having a predetermined temperature, generally in the range of between 45 and 180° F., to form a slurry. The slurry is agitated for a predetermined time, generally in the range of 1 to 60 minutes, and then dispersed into cheese milk. The cheese milk is agitated after the addition of the slurry to form enriched cheese milk. Accordingly, the invention may be said to lie in the creation of calcium enriched cheese milk since a natural cheese is manufactured from the enriched cheese milk in a conventional manner.

Alternatively, the above method may be described generally as a method of producing a predetermined natural cheese enriched with a dispersible calcium material. The process comprises adding the calcium material to a predetermined processing liquid to form a slurry, agitating the slurry for a predetermined period of time, dispersing the slurry in cheese milk prior to setting the cheese milk and completing a cheese manufacturing process.

A product made by the process of the present invention may be alternatively described as a calcium enriched natural cheese comprising: a calcium material suspended in a natural cheese by dispersing the calcium material generally throughout a cheese milk and processing the cheese milk into a natural cheese.

The calcium material used is preferably a tricalcium phosphate. However, wherever the terms calcium or calcium material are used herein they should be interpreted as including calcium materials which are generally insoluble but which may be processed in a human digestive system so that calcium is made available to a person's body after the natural cheese has been consumed. It will be understood that any calcium material or its equivalent meeting these criteria will have apparent application for use in the present invention. The preferred calcium material food grade tricalcium phosphate powder, for use with the invention disclosed herein, has a ratio of CaO to $P_2O_5$ in the range of 1.13:1 to 1.47:1 and 0% beta crystals.

While tricalcium phosphate is disclosed as the preferred calcium material, the calcium material of the present invention should be broadly interpreted to include calcium materials, which the human digestive system can use to obtain calcium for a person's body. However, the calcium material should not be of a type that is completely soluble in processing liquids like water or skim milk, or in liquids like cheese milk. The calcium material should be suspended in the cheese milk rather than in solution. In other words, the calcium material or calcium used, when mixed with the cheese milk, should not be a mixture of components in a single phase but should be a system in which the calcium material comprises particles, which are distributed throughout the cheese milk, so that settling of the calcium material particles is hindered by factors like the viscosity of the cheese milk or the impact of its molecules on the calcium material particles. The calcium material particles and cheese milk may also fall within the definition of a sol, i.e. a suspension of solid particles of colloidal dimensions in a liquid.

It should be noted that the level of calcium enrichment might vary from the specific levels disclosed herein. The level of calcium may be higher or lower than what is disclosed to be preferred or preferable in this disclosure. The present invention provides a product, a process, and/or a product by the process which allows for the production of a natural cheese having a level of calcium greater than it would have under prior known manufacturing techniques. Accordingly, the enhanced natural cheese claimed herein, the process for making the enhanced natural cheese claimed herein, and the product of the process claimed herein, are all products or processes which either have or produce a calcium level which is an enhancement of the normal calcium level produced by regular prior art cheese making methodologies. For example, a cheddar cheese manufactured according to the present invention disclosed herein, which would otherwise normally have a calcium level of 200 milligrams per ounce, would have an enhanced calcium level of at least 210 milligrams per ounce. Likewise, a mozzarella cheese, normally having 200 milligrams per ounce of calcium, would have 343 milligrams of calcium per ounce when made in accordance with the present invention

DETAILED DESCRIPTION

Although the disclosure hereof is detailed and exact to enable those skilled in the art to practice the invention, the physical embodiments and methods herein disclosed merely exemplify the invention which may be embodied in other specific structure or other specific methods. While the preferred embodiment has been described, the details may be changed without departing from the invention, which is defined by the claims.

The calcium enrichment procedure is as follows: Under agitation, tricalcium phosphate is added to skim milk or water at 45–180° F. to form slurry. If this slurry is to be used with a colored cheese such as cheddar, an appropriate food color or dye, such as an annatto dye, is used. Where the slurry is intended for use with an uncolored cheese such as Mozzarella, no food color or dye is added. The tricalcium phosphate slurry is agitated for 1 to 60 minutes. After the tricalcium phosphate slurry has been sufficiently mixed, the slurry is added to the cheese milk in a manner designed to ensure uniform dispersion throughout the cheese milk. One such manner is to add the slurry to the cheese milk by spraying the slurry uniformly over the cheese milk. Immediately after adding the tricalcium phosphate slurry to the cheese milk, the cheese milk is set using the coagulants appropriate to the type of cheese to be made. The coagulants and bacterial cultures used in this cheese making process are well known in the cheese making art. The cheese manufacturing process proceeds then in a conventional manner with the addition of the coagulant to the cheese milk containing the suspended calcium particles.

Because the tricalcium phosphate is insoluble and inert, most will be retained in the cheese. Laboratory tests indicate that up to 85% of the tricalcium phosphate is retained in the finished cheeses. In addition, the inclusion of tricalcium phosphate with the cheese milk does not affect the manufacturing parameters. Furthermore, tricalcium phosphate is soluble in a range of pH's commonly found in the human stomach, thereby becoming available for absorption by the human body. The use of this enrichment process produces natural cheese with elevated calcium levels. The level of calcium enrichment or elevation is controlled by the amount of calcium suspended in the cheese milk.

For example, a calcium enriched mozzarella cheese is made as follows:

1. 75 pounds of, food grade, tricalcium phosphate powder is added to 50 gallons of cold water to form slurry. The slurry is allowed to recirculate for 20 minutes to hydrate the tricalcium phosphate powder. The recirculation system comprises a stainless steel tank, a pump, and hose with a stainless steel nozzle. The slurry is recirculated from the stainless steel tank by the pump through the hose and out the nozzle back into the stainless steel tank. The nozzle is of a shape that the slurry is sprayed from the nozzle into the stainless steel tank.

2. Prior to adding the slurry to the cheese milk, 250 pounds of starter culture, comprising *Streptococcus thermophilus* and *Lactobacillus helveticus* is added to 43,000 pounds of milk at 95° F. and testing 2.0% fat.

3. The slurry is sprayed uniformly over the surface of the cheese milk using the hose and nozzle. (It is envisioned that, in the future, a processing plant may wish to use permanently positioned spray balls or nozzles.)

4. The cheese milk is set with coagulant immediately after adding the slurry, the coagulum forms and the curd is cut after 25 minutes of setting.

5. Ten minutes after the curd is cut it is heated to 106° F. in a period of 30 minutes.

6. One half the whey is then removed and the curd is stirred at 106° F. for 50 minutes.

7. The curd and whey are then pumped to an enclosed finishing table where the whey is drained off and the curd is washed with cold water.

8. The wash water is drained off and the curd is then salted. The total time on the finishing table is 50 minutes.

9. The curd is then sent to a known pasta filata machine (mixer) and heated to 1400 F for a few minutes; approximately 2–5 minutes.

10. The resulting plasticised curd mass is extruded into stainless steel molds, which are chilled with cold water for approximately 20 minutes.

11. The resulting cheese loaves are removed from the molds and brined for around three hours.

12. The brined loaves are packaged in plastic vacuumed bags.

The specific process produces a cheese having 48.9% moisture, 21% fat, a pH of 5.22, 1.9% salt, and an enhanced calcium level of 342.91 mg calcium/28 g cheese. A control cheese made using the same process without the addition of tricalcium phosphate yielded a cheese having 48.4% moisture, 21% fat, a pH of 5.17, 1.9% salt, and 175.47 mg calcium/28 g cheese.

The coagulants and bacterial cultures used in this cheese making process are well known in the cheese making art. The cheese manufacturing process proceeds then in a conventional manner.

The present invention may be applied to methods for the manufacture of hard or soft cheese, which, with the optional addition of food dyes, look just like unenriched cheeses. The cheese produced has good meltability characteristics and will melt like regular cheese, at temperatures below 400° F.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims. Accordingly, the above-described embodiments of this invention are merely descriptive of its principles and are not to be limited. The scope of this invention instead shall be determined from the scope of the following claims, including their equivalents.

What is claimed is:

1. An enriched natural cheese having at least 210 milligrams of calcium per 28 grams of said enriched natural cheese; said enriched natural cheese meltable at temperatures less than 400° F. and including a generally insoluble calcium material dispersed therein; said generally insoluble calcium material being capable of being absorbed by the digestive system of a human body.

2. A method for enriching natural cheeses meltable at temperatures less than 400° F., with a generally insoluble calcium material capable of being absorbed in at least one part of a digestive system of a human body comprising:

suspending the calcium material in a processing liquid, having a predetermined temperature, to form a slurry;

agitating the slurry for a predetermined time;

adding the slurry to a cheese milk;

agitating the cheese milk during the addition of the slurry to form an enriched cheese milk;

and completing a cheese manufacturing process; whereby; an enriched natural cheese meltable at temperatures below 400° F. is produced.

3. The method of claim 2 wherein the predetermined time is 1 to 60 minutes.

4. The method of claim 2 wherein the predetermined temperature is between 45 and 180° F.

5. A calcium enriched natural cheese, the natural cheese comprising at least 0.0075 grams of calcium material per gram of natural cheese; said calcium material being initially generally insoluble and capable of absorption into at least one part of a human digestive system; said calcium enriched natural cheese meltable at temperatures less than 400° F.

6. The calcium enriched natural cheese of claim 5 wherein the calcium material is soluble in a human digestive system.

7. The calcium enriched natural cheese of claim 5 wherein the calcium material is a tricalcium phosphate.

8. The calcium enriched cheese of claim 7 wherein the ratio of CaO to $P_2O_5$ is 1.13:1 to 1.47:1.

9. The calcium enriched cheese of claim 8 wherein the tricalcium phosphate includes 0% beta crystals.

10. A calcium enriched natural cheese comprising: a generally insoluble calcium material suspended in a natural cheese;

said calcium enriched natural cheese having at least 0.0075 grams of calcium material per each gram of said calcium enriched natural cheese; said calcium enriched natural cheese meltable at temperatures less than 400° F. said calcium material being capable of being absorbed by the digestive system of a human body.

11. A method of producing a natural cheese meltable at temperatures less than 400° F. and enriched with an initially insoluble calcium material capable of absorption into at least one part of a human digestive system, said method comprising:

adding the calcium material to a processing liquid to form a slurry;

agitating the slurry for a predetermined period of time;

suspending the slurry in a cheese milk prior to setting the cheese milk;

completing a cheese manufacturing process.

* * * * *